United States Patent
Minamitani et al.

[11] Patent Number: 5,936,235
[45] Date of Patent: Aug. 10, 1999

[54] CYLINDER PRESSURE SENSOR

[75] Inventors: Rintaro Minamitani, Tsukuba; Akio Yasukawa, Kashiwa; Shizuhisa Watanabe, Hitachinaka, all of Japan

[73] Assignee: Hitachi, Ltd., Tokyo, Japan

[21] Appl. No.: 09/030,853

[22] Filed: Feb. 26, 1998

[30] Foreign Application Priority Data

Feb. 26, 1997 [JP] Japan ..................... 9-041843

[51] Int. Cl.$^6$ ....................... H01J 5/16
[52] U.S. Cl. ................... 250/227.16; 250/231.1
[58] Field of Search ............ 250/227.16, 227.14, 250/231.1; 73/705; 385/12, 13

[56] References Cited

U.S. PATENT DOCUMENTS 5,430,815 7/1995 Shen et al. ................ 250/227.16

FOREIGN PATENT DOCUMENTS

A-7-306109 11/1995 Japan.
A-8-122188 5/1996 Japan.

*Primary Examiner*—Que T. Le
*Attorney, Agent, or Firm*—Antonelli, Terry, Stout & Kraus, LLP

[57] ABSTRACT

A cylinder pressure sensor is adapted to detect a cylinder pressure by detecting a change in the amount of light being transmitted through an optical fiber in an axial direction. Two support portions support the optical fiber at two points along the length thereof. A diaphragm in contact with the optical fiber causes bending of the optical fiber in dependence upon a change in the cylinder pressure. The position at which a force is applied against the optical fiber by the diaphragm is deviated from a center position between the two support portions. The resulting cylinder pressure sensor is capable of accurately measuring cylinder pressure and knocking over a long period of time with a low cost and reduced initial variations.

4 Claims, 4 Drawing Sheets

CYLINDER PRESSURE SENSOR

FIELD OF THE INVENTION

This invention relates to measurement of engine cylinder pressure (pressure inside the cylinder of an engine) for controlling the engine, or another pressure measurement to be carried out by a pressure sensor utilizing an optical fiber.

BACKGROUND OF THE INVENTION

A cylinder pressure sensor is disclosed, for example, in Unexamined Published Japanese Patent Application No. 7-306109 (hereinafter referred to as "conventional art 1"), wherein an optical fiber is subjected to bending depending on a variation in cylinder pressure, so that the cylinder pressure is detected by the variation in the amount of light being transmitted through the optical fiber, thereby enhancing the measurement accuracy.

Meanwhile, Unexamined Published Japanese Patent Application No. 8-122188 (hereinafter referred to as "conventional art 2") discloses a sensor that is simplified as compared to the structure of the conventional art 1, to thereby achieve a reduction in cost.

The cylinder pressure sensors of the conventional arts 1 and 2 are effective in terms of enhancing the accuracy in measuring the cylinder pressure. However, they have a limitation as to the frequency that can be measured. There is, therefore, a problem in that it is impossible to accurately detect vibrations occurring in a high frequency range (hereinafter referred to as "knocking") at a pressure of a low as approximately $\frac{1}{1000}$ of the cylinder pressure.

On the other hand, a cylinder pressure sensor requires stable detection of signals over a long period of time, since it is mounted on an automotive vehicle. Furthermore, it is preferred for the cylinder pressure sensor to structurally avoid initial variations in the cylinder pressure and the knocking signals for each cylinder.

SUMMARY OF THE INVENTION

It is the object of the present invention to provide a cylinder pressure sensor that is capable of accurately measuring cylinder pressure and knocking over a long period of time with low cost and reduced initial variations.

The cylinder pressure sensor of the present invention, which is adapted to detect cylinder pressure by a change in the amount of light being transmitted through an optical fiber in an axial direction, comprises:

two support portions for supporting the optical fiber at two points along the length thereof, and a diaphragm for applying a force against the optical fiber to subject it to bending in dependence upon a change in the cylinder pressure, wherein the position of application of force against the optical fiber is deviated from a center position between the two support portions.

Also, the cylinder pressure sensor of the present invention, which is adapted to detect cylinder pressure by a change in the amount of light being transmitted through an optical fiber in an axial direction, comprises:

two support portions for supporting the optical fiber at two points along the length thereof, and a diaphragm for applying a force against the optical fiber to subject it to bending in dependence upon a change in the cylinder pressure, wherein the position of application of force against the optical fiber is located generally at a center of the diaphragm, and the center of the diaphragm is deviated from the center position between the two support portions.

With the structure as described above, there is a decrease in the amount of the light being transmitted through the optical fiber due to a bending displacement of the optical fiber, and there is an increase in the rate of change of the amount of the light being transmitted through the optical fiber with respect to the bending displacement of the optical fiber, thereby making it possible to accurately detect a slight displacement in the optical fiber. It is therefore possible to detect not only cylinder pressure, but also knocking as small as approximately $\frac{1}{1000}$ of the cylinder pressure.

Also, the load occurring at the support portion increases on the shorter side of the distance between the support portion and the force applying position, so that the condition of support of the optical fiber is approximated to a fixed support, and, accordingly, the resonant frequency increases to make it possible to detect knocking with accuracy. Further, on the longer side of the distance between the support portion and the force applying position, the bending angle decreases so that the optical fiber can be prevented from being stuck by the frictional force at the support portion. It is therefore possible to avoid initial variations in the cylinder pressure and the knocking signals for each cylinder, enabling stabilized detection of the cylinder pressure and the knocking signals over a long period of time.

As described, the effect of the present invention is achieved by displacing the position of application of force against the optical fiber from a center between the two support portions, and the distance of deviation preferably lies in a range of between 10% and 40% of the distance between the two support portions. In this regard, if the deviation amount from the center is 10% or more of the distance between the two support portions, there is no possibility that the deviation amount in design will be offset by errors in assembling. Therefore, even if the fabrication is at a limit of the assembling errors, the effect of the present invention is available. On the other hand, if the deviation amount from the center of not greater than 40% of the distance between the two support portions, there is no fear that the optical fiber, if fabricated at the limit of errors due to assembling, will be fractured by the force applying portion and the support portion. Thus, the effect of the present invention is available.

Further, the cylinder pressure sensor of the present invention further comprises a means for relieving strain between the two support portions and the diaphragm so as to prevent the application of strain to the optical fiber due to pressure exerted on the two support portions. The means for relieving the strain may be achieved by lowering the rigidity at the connecting portion between the support portion and the diaphragm. For example, it is effective to provide a slit between the support portion and the diaphragm or the like. With such a structure, the accuracy of measurement can be enhanced because the pressure or the like occurring upon mounting the cylinder pressure sensor onto the engine is not applied to the optical fiber.

DETAILED DESCRIPTION OF THE INVENTION

Various embodiments will be described in detail hereinbelow with reference to the drawings.

[First Embodiment] (FIG. 1(a)–FIG. 6)

An engine main body is formed by a cylinder block having cylindrical spaces defined for cylinders and a cylinder head mounted thereon with intake and exhaust pipes for each cylinder, wherein the cylinder block and the cylinder head are assembled with a gasket disposed therebetween. The combustion within the cylinder is controlled by measuring the cylinder pressure, or the knocking attended by abnormal combustion, for the purpose of reducing detrimental substances contained in exhaust gases and enhancing the combustion efficiency. Therefore, a cylinder pressure sensor is required to accurately measure not only cylinder pressure, but also knocking. The cylinder pressure sensor according to this embodiment is provided within the gasket. The gasket is an engine part that is capable of being mounted and dismounted, the interior of which provides a comparatively stable environment against mechanical vibration and temperature change.

Figure 1A:
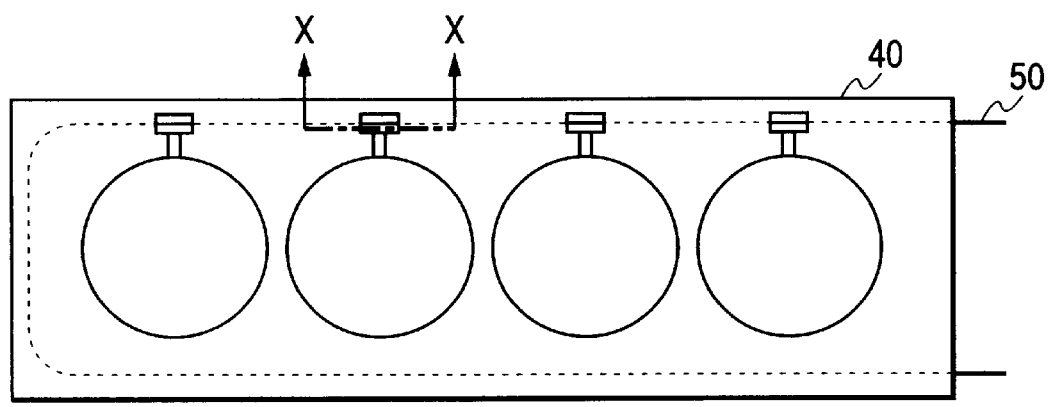
FIG. 1(*a*) is a diagram showing cylinder pressure sensors mounted in a sensor block and a gasket mounted therewith according to a first embodiment of the present invention, and FIG. 1(*b*) is a cross-section taken on line X—X in FIG. 1(*a*)
Figure 1B:
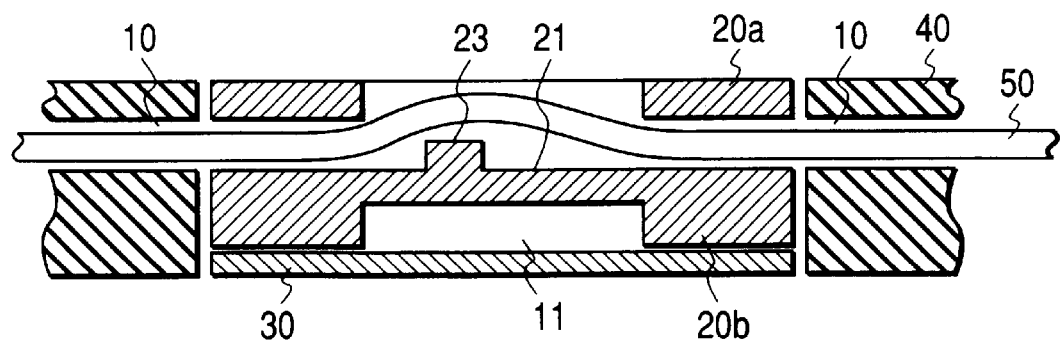

FIG. 1(a) shows a gasket 40 in which there are mounted cylinder pressure sensors according to the first embodiment of the present invention, while FIG. 1(b) shows an enlarged cross-sectional view taken on line X—X in FIG. 1(a). In FIG. 1(b), 10 denotes a groove provided in the gasket 40 and 11 denotes a region in which the cylinder pressure is directly loaded. The groove 10 has a width and a depth sufficient for accommodating therein on optical fiber 50.

A sensor block 20 includes a base 20a having an upper opening portion to allow the optical fiber 50 to bend and diaphragm portion 20b which biases the optical fiber 50 in dependence upon a change in internal pressure within the engine cylinder. In FIG. 1(b), although the base 20a is provided with an upper opening portion, the shape of this opening portion may take any form, provided that it can provide a region for the bending of the optical fiber to hold the optical fiber along a predetermined span thereof.

The optical fiber 50 is prevented from being subjected to a pressure upon attaching the gasket to the engine by making the depth of the fiber passage for the optical fiber laying portion deeper than the outside size of the optical fiber 50 (in the operating state). In this case, consideration is given to the flex deformation of the gasket itself during tightening of the cylinder head.

The depth of a sensor block embedding portion in the gasket is greater than the height of the sensor block 20. For this reason, a space (transferring space) for inducing the combustion pressure is provided at a lower portion of the diaphragm. Also, an internal pressure sealing means 30 is provided below the diaphragm portion 20b of the sensor block 20. The internal pressure sealing means 30 is in the form of a metal member that has a seal resin applied thereto, such as a silicone resin. Due to this, a pressure difference is created at the upper and lower portions of the diaphragm portion 20b of the diaphragm 21 of the sensor block 20, so that a displacement of the diaphragm 21 caused this pressure difference is converted into an optical fiber bending force. The cylinder pressure sensor serves to detect a variation in the amount of light being transmitted through the optical fiber when it is bent.

Figure 2:
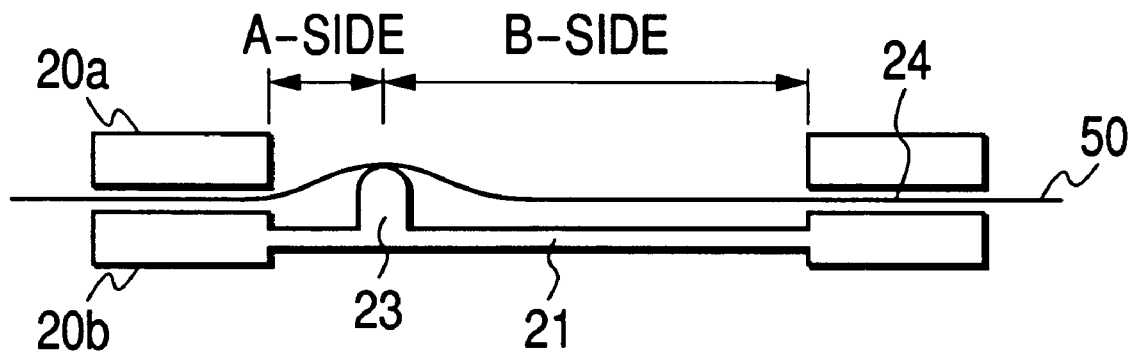
FIG. 2 is a diagrammatic cross-sectional view of a sensor block used in the first embodiment of the present invention.

FIG. 2 shows a cross-sectional view of the sensor block 20 employed in the first embodiment. The figure is a cross-sectional view taken along the passage of the fiber 50. The optical fiber 50 passes through an optical fiber passage 24 formed in one side of the base 20a, such that it contacts the projection 23 provided on the diaphragm 21. The optical fiber 50 passes out of the sensor block 20 through an optical fiber passage at the opposite side of the base 20a. The optical fiber passage 24 is greater in diameter than the outside size of the fiber 50 so as to accommodate a variation in position of the optical fiber in the fiber passage 24 with variation in support conditions and bending deformations of the fiber, with the result that the amount of light being transmitted through the optical fiber can be varied.

Figure 3:
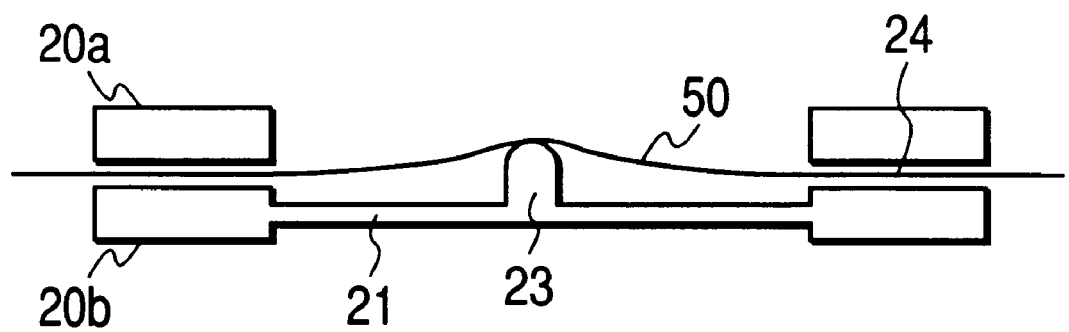
FIG. 3 is a diagrammatic cross-sectional view of a sensor block used in a conventional cylinder pressure sensor.

The center position between support points of the base 20a, where the optical fiber 50 is held at both terminal ends against transverse movement, generally coincides in the prior art, as seen in FIG. 3, with the center position of the diaphragm 21, which operates as a pressure transmitting means. However, in accordance with the present invention, the center position of the projection 23 is deviated from the center position of the diaphragm 21, as seen in FIG. 2. The width of the projection 23, together with the width of the passage 24, are selected to be substantially equal so that the optical fiber will not be disengaged from the projection 23 even when the optical fiber is shifted sideways. Thus, the optical fiber 50 is supported by the sensor block 20 and the projection 23. The shifting in position of the projection 23 relative to the sensor block 20 provides a radius of curvature to the optical fiber 50. If the cylinder pressure increases, a pressure is applied upwardly against the bottom of the diaphragm 21. In response thereto, the diaphragm 21 is deflected, causing the radius of curvature of the optical fiber 50 to decrease.

In the conventional cylinder pressure sensor, the position of the projection 23 lies at the center position between the support points of the base 20a of the sensor block 20, as shown in FIG. 3. In the cylinder pressure sensor of this embodiment, however, the position of the projection 23 is deviated from the center position between the support points of the base 20a of the sensor block 20. This deviation produces a theoretical difference between the shorter side (A-side in FIG. 2) of the distance between the base portion 20a and the projection 23 and the longer side (B-side in FIG. 2) thereof. That is, the radius of curvature of the optical fiber 50 is smaller on the A-side and greater on the B-side, as compared to the case where the projection 23 is at the center of the support points of the sensor block 20. As a result, the loss of the amount of light being transmitted through the optical fiber 50 occurs principally on the A-side.

The load generated in the supported portion of the optical fiber 50 becomes larger on the A-side, as compared to the case where the projection 23 is at the center position between the support points of the sensor block 20. Due to this, the support condition on the A-side of the optical fiber 50 is approximated to a fixed support, while the load generated on the B-side becomes small with the support condition approximated to a simple support. Such a structural asymmetry provides the effects given below.

Figure 4:
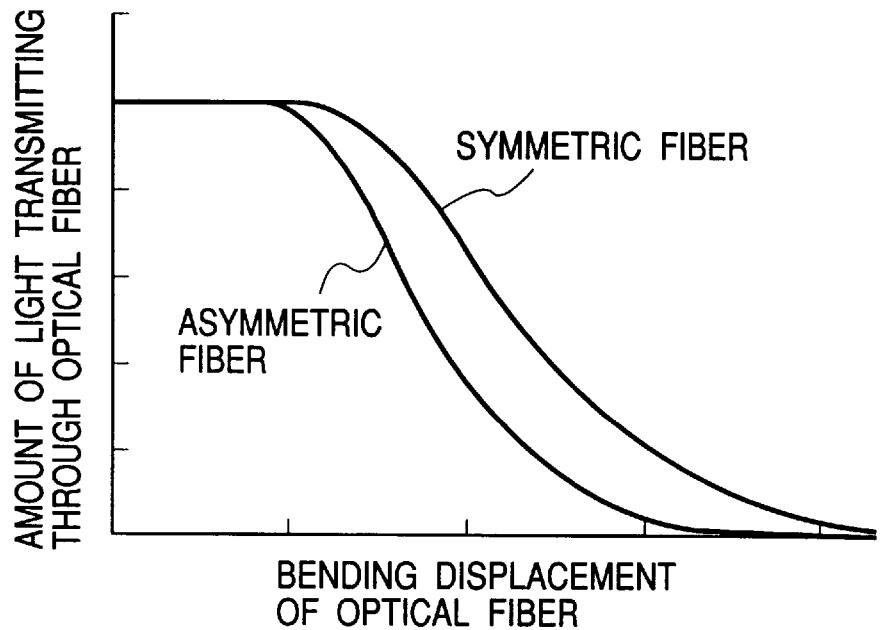
FIG. 4 is a graph showing, as an example, a sensitivity measurement for an optical fiber.

FIG. 4 typically shows a measurement example of the rate of change in the amount of light being transmitted with respect to the bending displacement of the optical fiber, wherein the vertical axis denotes the amount of light being transmitted through the optical fiber and the horizontal axis denotes a bending displacement of the optical fiber. As shown in the figure, an asymmetric fiber (cylinder pressure sensor of this embodiment) exhibits a higher rate of change of the amount of light being transmitted with respect to the bending displacement than that of a symmetric fiber (conventional cylinder pressure sensor).

In this manner, according to this embodiment, there are a decrease in the amount of light being transmitted through the optical fiber due to the bending displacement of the optical fiber and an increase in the rate of change in the amount of light being transmitted through the optical fiber with respect to the bending displacement of the optical fiber. This makes it possible to detect even a slight displacement of the optical fiber with accuracy. Therefore, it is possible to detect, not only the cylinder pressure, but also knocking having a magnitude of as small as approximately 1/1000 of the cylinder pressure.

Figure 5:
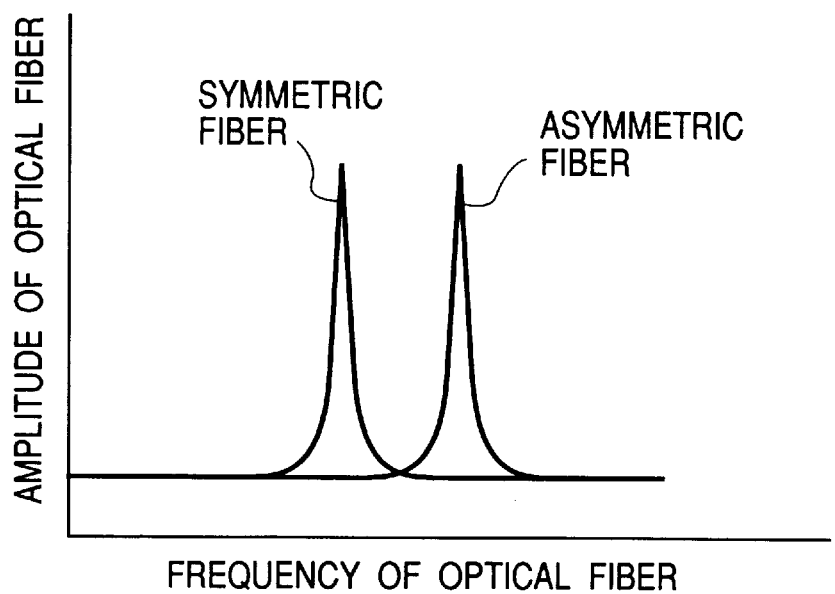
FIG. 5 is a graph showing, as an example, a frequency response measurement for an optical fiber.

FIG. 5 typically shows a measurement example of the frequency response of the optical fiber, wherein the vertical axis denotes the amplitude of an optical fiber, while the horizontal axis denotes the frequency of the optical fiber. As shown in the figure, the resonant frequency (the frequency at which the amplitude of the optical fiber becomes a maximum) for the asymmetric fiber (the cylinder pressure sensor of this embodiment) is higher than that of the symmetric fiber (conventional cylinder pressure sensor). This is because the load is greater in the support portion on the A-side, where the distance between the base 20a and the projection 23 is short, so that the support condition for the optical fiber 50 approximates a fixed support.

In this manner, since the asymmetric fiber (the cylinder pressure sensor of this embodiment) has a higher resonant frequency than the symmetric fiber (the conventional cylinder pressure sensor), it is possible to detect, not only the cylinder pressure, but also knocking having a frequency approximately 100 times higher than the cylinder pressure. Incidentally, although the resonant frequency can be increased by fixedly supporting the optical fiber at the respective support points, this is not preferred because of the bending strains caused thereby in the optical fiber and a lowering of the bending-fracture life of the optical fiber.

Figure 6:
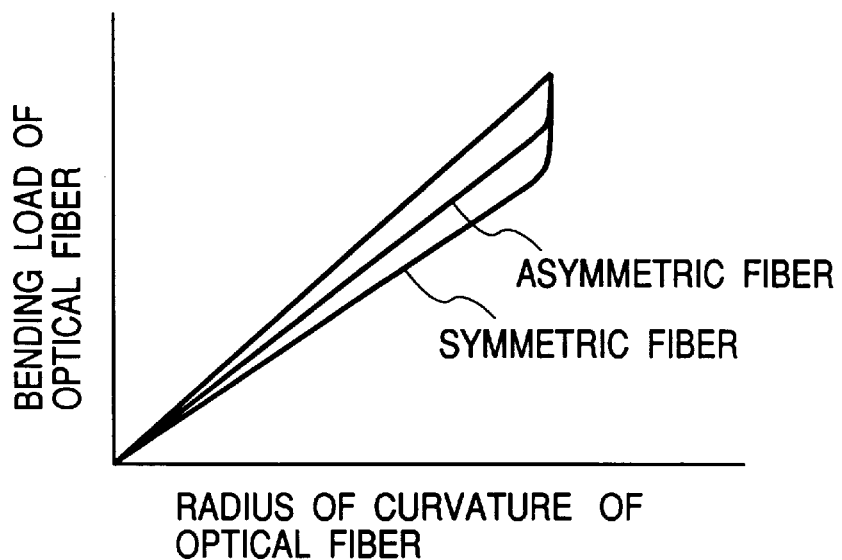
FIG. 6 is a graph showing, as an example, a hysteresis measurement for an optical fiber.

FIG. 6 typically shows a measurement example of the hysteresis of the optical fiber, wherein the vertical axis denotes the bending load on the optical fiber produced by the projection, while the vertical axis denotes the radius of curvature of the optical fiber being bent by the projection.

As shown in the figure, the hysteresis in the asymmetric fiber (the cylinder pressure sensor of this embodiment) is smaller than that in the symmetric fiber (the conventional cylinder pressure sensor). This is because, in the symmetric fiber arrangement (the conventional cylinder pressure sensor), the fiber bending angle increases at approximately the same rate at both terminal ends of the sensor block as the displacement of the optical fiber increases. If this bending angle increases by greater than a certain magnitude, the optical fiber becomes fixedly supported by the sensor block at both terminal ends so that it causes sticking due to the frictional force in the optical fiber support portions, thereby increasing the hysteresis. On the other hand, in the asymmetric fiber arrangement (the cylinder pressure sensor of this embodiment), the optical fiber may become fixedly supported on the A-side, where the distance between the sensor block base 20a and the projection 23 is small, but it has a decreased bending angle on the longer-distance B-side, as compared to the case where the projection 23 is positioned at the center. Therefore, the optical fiber 50 is prevented from sticking at the support position on the B-side, leading to a lowering of the hysteresis.

The decreased hysteresis makes it possible to structurally avoid the initial variations in cylinder pressure and knock signals without relying on electric signal processes. Further, since there is no sticking of the optical fiber at the support portion, it is possible to detect the stabilized cylinder pressure and knocking signals for each cylinder over a long period of time.

Figure 7:
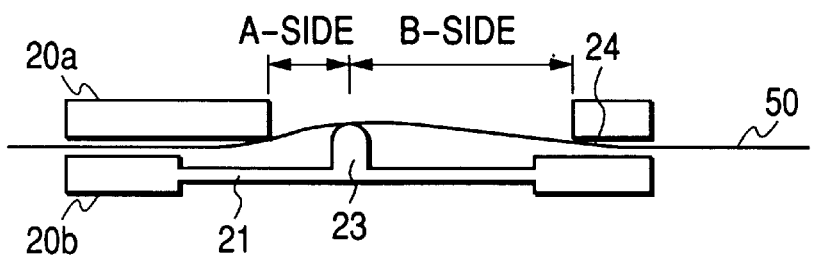
FIG. 7 is a diagrammatic cross-sectional view of a sensor block used in a second embodiment of the present invention.

[Second Embodiment] (FIG. 7)

FIG. 7 shows a cross-sectional view of the sensor block 20 according to a second embodiment of the present invention. The projection 23, serving as a bending means, is provided in this embodiment at the center of the diaphragm 21 to form a pressure transmitting means, and contacts the optical fiber 50 at one point. However, unlike embodiment 1, the opening in the support block base 20a is shifted relative to the diaphragm portion 20b so that there is provided a deviation between the position of the projection 23 and the center position between the support points of the sensor block base 20a, serving as a support means for transversely supporting the optical fiber 50 at both terminal ends. This causes a difference in principle between the shorter side (A-side at the left in the figure) of the distance between the sensor block base 20a and the projection 23 and the longer side (B-side at the right in the figure) thereof. That is, the optical fiber 50 has a radius of curvature that is smaller on the A-side and larger on the B-side as compared to the case where the projection 23 is positioned at the center position between the support points of the sensor block 20. Thus, the reduction in the amount of light being transmitted through the optical fiber principally occurs on the A-side.

Also, the load occurring at the support portion becomes greater on the A-side as compared to the case where the projection 23 is located at the center position between the support points of the sensor block 20. Accordingly, the support condition for the optical fiber 50 is approximated to a fixed support, while the load generated on the B-side becomes small with a support condition approximated to a simple support.

The above-stated asymmetric structure provides similar effects to the first embodiment. Further, since the projection 23 is provided at the center of the diaphragm 21, the pressure is converted into a greater displacement to thereby further enhance the sensor sensitivity, as compared to the case where the projection 21 is arranged at a location other than the center of the diaphragm 21.

Figure 8:
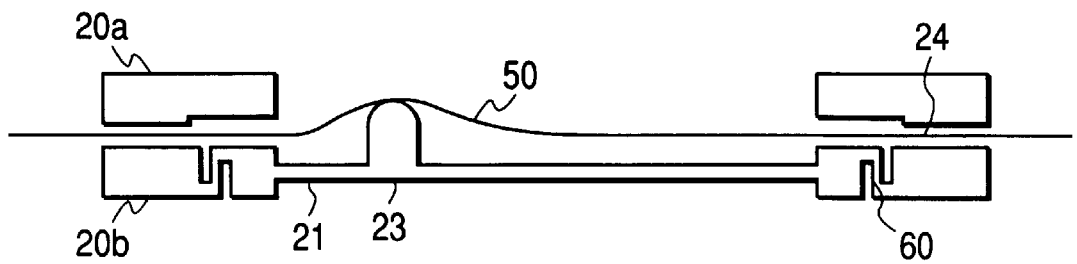
FIG. 8 is a diagrammatic cross-sectional view of a sensor block used in a third embodiment of the present invention.

[Third Embodiment] (FIG. 8)

FIG. 8 shows a third embodiment according to the present invention, wherein a slit 60 for releasing residual strain is provided at the peripheral portion of the diaphragm 21, which serves as a pressure transmitting means.

The groove 10 at the optical fiber attaching portion is made deeper than the outside size of the optical fiber 50 (in the operating state) so that no pressure is exerted onto the optical fiber 50 during tightening for attaching the gasket to the engine. For example, when the sensor block 20 is joined by welding, it is impossible to fully eliminate residual strain by mere appropriation on the welding condition. However, according to this embodiment, residual strain can be relieved by the provision of the slit 60.

Although a single slit 60 is preferably provided at each side, an increase in the number of slits makes possible a further reduction of the residual strains. Where a plurality of slits are provided, it is desirable to provide them in a staggered manner as in the figure. Also, where intense residual strains are to be removed, it is desirable to decrease the spacing between the slits within a design strength range of the diaphragm 21.

According to the embodiments as described above, the initial variations in cylinder pressure and knocking signals for each cylinder can be structurally avoided without relying on electric signal processing. These embodiments are effective for the case where there are limitations in the height direction, as in a cylinder pressure sensor inserted in a gasket.

The present invention provides a structure wherein the center of the bending means for providing a pressure-change dependent bending to the optical fiber is deviated relative to the center of the optical fiber support means. Therefore, it is possible to offer a cylinder pressure sensor which is capable of accurately measuring not only cylinder pressure, but also knocking over a long period of time, with cost reduced and initial variations suppressed.

While the invention has been described in detail and with reference to specific embodiments thereof, it will be apparent to one skilled in the art that various changes and modifications can be made therein without departing from the spirit and scope thereof.

What is claimed is:

1. A cylinder pressure sensor to detect cylinder pressure by detecting a change in the amount of light being transmitted through an optical fiber in an axial direction, comprising:

two support portions for supporting said optical fiber at two points along the length thereof, and a diaphragm for applying a force against said optical fiber to cause bending of said optical fiber in dependence upon a change in cylinder pressure, wherein the position of application of force against said optical fiber is deviated from a center position between the two support portions.

2. A cylinder pressure sensor to detect cylinder pressure by detecting a change in the amount of light being transmitted through an optical fiber in an axial direction, comprising:

two support portions for supporting said optical fiber at two points along the length thereof, and a diaphragm for applying a force against said optical fiber to cause bending of said optical fiber in dependence upon a change in cylinder pressure, wherein the position of application of force against said optical fiber is located generally at a center of said diaphragm, and the center position of said diaphragm is deviated from a center position between the two support portions.

3. A cylinder pressure sensor according to claim 1 or 2, wherein the distance of deviation is in a range of from 10% to 40% of the distance between the two support portions.

4. A cylinder pressure sensor according to claim 1 or claim 2, further comprising means for relieving strain between the two support portions and said diaphragm so as to prevent strain from being applied to said optical fiber due to pressures exerted on the two support portions.

* * * * *